United States Patent
Lim et al.

(10) Patent No.: US 10,091,455 B2
(45) Date of Patent: Oct. 2, 2018

(54) APPARATUS AND METHOD FOR FRAME RATE CONVERSION

(71) Applicant: SAMSUNG ELECTRONICS CO., LTD., Suwon-si (KR)

(72) Inventors: Hyung-jun Lim, Seoul (KR); Dong-yoon Kim, Suwon-si (KR); Seong-hoon Choi, Yongin-si (KR); Tae-gyoung Ahn, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/141,963

(22) Filed: Apr. 29, 2016

(65) Prior Publication Data
US 2017/0150095 A1 May 25, 2017

(30) Foreign Application Priority Data
Nov. 25, 2015 (KR) .......................... 10-2015-0165803

(51) Int. Cl.
| | |
|---|---|
| *H04N 7/01* | (2006.01) |
| *H04N 5/911* | (2006.01) |
| *H04N 5/783* | (2006.01) |
| *H04N 5/21* | (2006.01) |

(52) U.S. Cl.
CPC ........... *H04N 7/0127* (2013.01); *H04N 5/783* (2013.01); *H04N 5/911* (2013.01); *H04N 7/014* (2013.01); *H04N 7/0125* (2013.01); *H04N 5/21* (2013.01)

(58) Field of Classification Search
CPC ...... H04N 7/0127; H04N 5/783; H04N 5/911; H04N 7/0125; H04N 7/014; H04N 5/21
USPC ....... 348/441, 443, 451, 452, 455, 456, 459, 348/469, 606, 607, 620, 699, 700, 701, 348/68; 375/240.12, 240.14, 240.16, 375/240.24, 240.27; 382/107, 197, 261, 382/236, 275, 224
See application file for complete search history.

(56) References Cited

U.S. PATENT DOCUMENTS

| | | | |
|---|---|---|---|
| 6,977,963 B1* | 12/2005 | Shiiyama | G06F 17/30802 348/700 |
| 8,325,812 B2* | 12/2012 | Kwon | H04N 5/145 375/240.16 |
| 2004/0174459 A1* | 9/2004 | Holt | G06T 7/20 348/452 |
| 2004/0227851 A1* | 11/2004 | Min | H04N 5/145 348/441 |
| 2004/0246374 A1* | 12/2004 | Mishima | H04N 7/0132 348/441 |
| 2007/0030900 A1* | 2/2007 | Verdu | G06T 5/002 375/240.13 |
| 2008/0089419 A1* | 4/2008 | Kervec | G06T 3/4007 375/240.17 |

(Continued)

*Primary Examiner* — Michael Lee
(74) *Attorney, Agent, or Firm* — Sughrue Mion, PLLC

(57) ABSTRACT

A frame rate conversion apparatus is provided. The frame rate conversion apparatus includes at least one processor configured to determine a noise strength of a block of a current frame among a plurality of frames forming an input video, generate a block of an interpolation frame corresponding to the block of the current frame by estimating a motion vector of a block of the interpolation frame based on the noise strength, and insert the interpolation frame between the current frame and an adjacent frame to adjust a frame rate of the input video.

12 Claims, 13 Drawing Sheets

(56) References Cited

U.S. PATENT DOCUMENTS

| | | | |
|---|---|---|---|
| 2009/0161010 A1* | 6/2009 | Tran | H04N 19/577 348/441 |
| 2009/0232407 A1* | 9/2009 | Aoyama | H04N 19/176 382/224 |
| 2009/0316784 A1* | 12/2009 | Kervec | G06T 3/4007 375/240.16 |
| 2010/0020232 A1* | 1/2010 | Mori | G09G 3/20 348/452 |
| 2010/0026898 A1* | 2/2010 | Ueno | H04N 9/8042 348/607 |
| 2010/0039557 A1* | 2/2010 | Mori | G09G 3/20 348/459 |
| 2010/0079665 A1* | 4/2010 | Yamauchi | H04N 19/172 348/416.1 |
| 2010/0085477 A1* | 4/2010 | Ooishi | G09G 3/3406 348/448 |
| 2010/0165207 A1* | 7/2010 | Deng | H04N 5/213 348/620 |
| 2010/0316125 A1* | 12/2010 | Chappalli | H04N 19/132 375/240.16 |
| 2011/0176027 A1* | 7/2011 | Tanaka | H04N 19/176 348/222.1 |
| 2011/0255004 A1* | 10/2011 | Tran | H04N 5/145 348/699 |
| 2011/0279684 A1* | 11/2011 | Motoyama | H04N 19/176 348/181 |
| 2012/0068999 A1* | 3/2012 | Yoo | H04N 13/0497 345/419 |
| 2012/0154675 A1* | 6/2012 | Nasu | H04N 7/014 348/452 |
| 2013/0176488 A1* | 7/2013 | Nakashima | H04N 7/014 348/452 |
| 2013/0215241 A1* | 8/2013 | Onishi | G09G 3/20 348/51 |
| 2014/0056337 A1* | 2/2014 | Kesling | H04B 1/38 375/219 |
| 2014/0125650 A1* | 5/2014 | Neill | H04N 13/0011 345/419 |
| 2015/0103250 A1* | 4/2015 | Watanabe | H04N 5/21 348/576 |
| 2015/0264264 A1* | 9/2015 | Shiraki | H04N 5/23267 348/68 |

* cited by examiner

CURRENT FRAME

PREVIOUS FRAME

INTERPOLATION FRAME

900

APPARATUS AND METHOD FOR FRAME RATE CONVERSION

CROSS-REFERENCE TO RELATED APPLICATION

This application claims priority from Korean Patent Application No. 10-2015-0165803, filed on Nov. 25, 2015, in the Korean Intellectual Property Office, the disclosure of which is incorporated herein by reference in its entirety.

BACKGROUND

1. Field

Apparatuses and methods consistent with exemplary embodiments relate to converting a frame rate of a video, and more particularly, to converting a frame rate of a video using motion estimation.

2. Description of the Related Art

Electronic technologies have developed to realize high-definition and high-quality images in display apparatuses.

As a result, recent broadcasting services use Full High Definition (FHD) or Ultra High Definition (UHD), and such broadcast services are processed by High Definition Televisions (HDTVs).

However, it is difficult to clearly reproduce high-definition video using only the frames from the video content provider. For example, a motion blur phenomenon, in which a quickly moving object is blurred, may occur.

In order to solve this problem, a technology that inserts an interpolation frame between original frames of a video image, to increase the number of frames of the video image per second, has been actively studied.

However, due to noise that randomly occurs in frames of the video image, an image quality of the interpolation frame may fall short of an expected image quality.

Therefore, there is a need for methods of minimizing an effect of noise in the interpolation technique.

SUMMARY

Exemplary embodiments described herein may overcome the above disadvantages and other disadvantages not described above. However, the exemplary embodiments are not necessarily required to overcome the disadvantages described above, and an exemplary embodiment may not overcome any of the problems described above.

Exemplary embodiments provide an apparatus and a method for performing a motion estimation using a strength of noise of an image frame to perform a frame rate conversion.

According to an aspect of an exemplary embodiment, there is provided a frame rate conversion apparatus which includes at least one processor configured to determine a noise strength of a block of a current frame among a plurality of frames forming an input video, generate a block of an interpolation frame corresponding to the block of the current frame by estimating a motion vector of a block of the interpolation frame based on the noise strength, and insert the interpolation frame between the current frame and an adjacent frame to adjust a frame rate of the input video.

The processor may be further configured to perform block matching between the block of the current frame and blocks of adjacent frames among a plurality of frames and determine the noise strength based on a result of the block matching.

The processor may be further configured to determine the noise strength of the block of the current frame based on pixel value differences between the block of the current frame and corresponding blocks of the adjacent frames.

The processor may be further configured to, in response to noise strength of the block of the current frame being less than a noise strength value, estimate the motion vector of the block of the interpolation frame based on the block matching.

The processor may be further configured to estimate the motion vector of the block of the interpolation frame based on a location of the block of the adjacent frames matching with the block of the current frame.

The processor may be further configured to, in response to noise strength of the block of the current frame being greater than a noise strength value, estimate the motion vector of the block of the interpolation frame by correcting a motion vector acquired according to the block matching.

The processor may be further configured to correct a motion vector acquired according to a block matching result based on at least one motion vector of at least one other block of the current frame According to an aspect of another exemplary embodiment, there is provided a frame rate conversion method including: determining a noise strength of a block of a current frame among a plurality of frames forming an input video; generating a block of an interpolation frame corresponding to the block of the current frame by estimating a motion vector of a block of the interpolation frame based on the noise strength; and inserting the interpolation frame between the current frame and an adjacent frame to adjust a frame rate of the input video.

The frame rate conversion method may further include: performing block matching between the block of the current frame and blocks of adjacent frames among the plurality of frames to estimate the motion vector; and determining the noise strength based on a result of the block matching.

The frame rate conversion method may further include: determining the noise strength of the block of the current frame based on pixel value differences between the block of the current frame and corresponding blocks of the adjacent frames.

The frame rate conversion method may further include: in response to noise strength of the block of the current frame being less than a noise strength value, estimating the motion vector of the block of the interpolation frame based on the block matching.

The frame rate conversion method may further include: estimating the motion vector of the block of the interpolation frame based on a location of the block of the adjacent frames matching with the block of the current frame.

The frame rate conversion method may further include: in response to the noise strength of the block of the current frame being greater than a noise strength value, estimating the motion vector of the block of the interpolation frame by correcting a motion vector acquired according to block matching.

The estimating the motion vector the block of the interpolation frame may include: correcting the motion vector acquired according to the block matching result based on at least one motion vector of at least one other block of the current frame.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Figure 1:
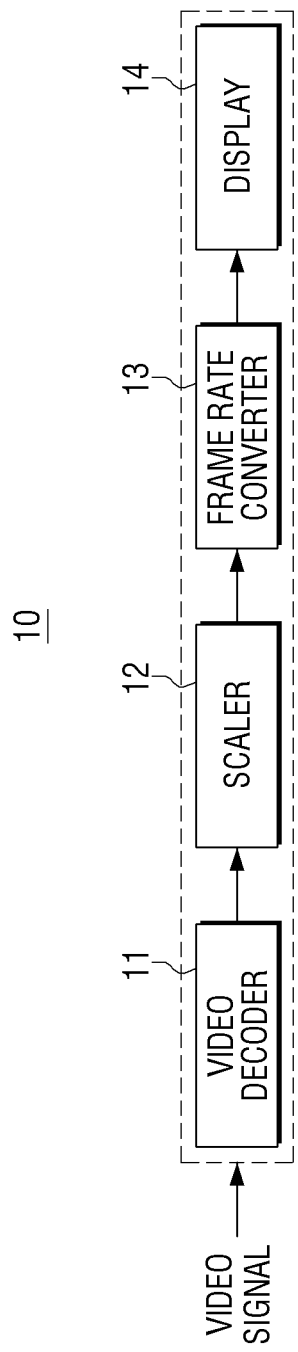
FIG. 1 is a block diagram illustrating video signal processing of a display apparatus according to an exemplary embodiment.

Various exemplary embodiments will be described below in greater detail with reference to the accompanying drawings.

In the following description, same drawing reference numerals are used for the same elements even in different drawings. The matters defined in the description, such as detailed construction and elements, are provided to assist in a comprehensive understanding of the inventive concept. Thus, it is apparent that the exemplary embodiments may be carried out without those specifically defined matters. Also, well-known functions or constructions are not described in detail since they would obscure the inventive concept with unnecessary detail.

General terms are selected as the terms used in the specification and claims in consideration of functions of various exemplary embodiments. However, these terms may vary according to intentions of technicians skilled in the art or legal or technical interpretations and emergencies of new technologies. Also, some terms are arbitrarily selected by an applicant. These terms may be interpreted as a meaning defined in the present specification. If there is no detailed term definition, the terms may be interpreted based on overall contents of the present specification and normal technical common senses of the art.

Also, the same reference numerals or signs respectively described in the drawings attached to the present specification indicate parts or elements that perform the actually same functions. For convenience of description and understanding, the same reference numerals or signs will be used and described in different exemplary embodiments. In other words, although elements having the same reference numerals are all illustrated in a plurality of drawings, the plurality of drawings do not mean one exemplary embodiment.

Also, the terms "first," "second," etc. may be used to describe diverse components, but the components are not limited by the terms. The terms are only used to distinguish one component from the others. For example, used orders, arrangement orders, or the like of elements that are combined with these ordinal numbers may not be limited by the numbers. If necessary, the ordinal numbers may be respectively replaced and used.

The singular expression also includes the plural meaning as long as it does not differently mean in the context. In the present application, the terms "include" and "comprise" designate the presence of features, numbers, steps, operations, components, elements, or a combination thereof that are written in the specification, but do not exclude the presence or possibility of addition of one or more other features, numbers, steps, operations, components, elements, or a combination thereof.

In the exemplary embodiment, a "module" or a "unit" performs at least one function or operation, and may be implemented with hardware, software, or a combination of hardware and software. In addition, a plurality of "modules" or a plurality of "units" may be integrated into at least one module except for a "module" or a "unit" which has to be implemented with specific hardware, and may be implemented with at least one processor (not shown).

Also, when any part is connected to another part, this includes a direct connection and an indirect connection through another medium. Unless otherwise defined, when any part includes any element, it may mean that any part further include other elements without excluding other elements.

If it is determined that detailed descriptions of related well-known functions or elements unnecessarily make the scope of the inventive concept unclear, their detailed descriptions are abbreviated or omitted.

FIG. 1 is a block diagram illustrating video signal processing of a display apparatus according to an exemplary embodiment.

Referring to FIG. 1, a video signal is processed through a video decoder 11, a scaler 12, a frame rate converter 13, and a display 14.

The video decoder 11 decodes the video signal. Therefore, a decompressed (decoded) video signal is output from the video decoder 11.

The scaler 12 scales a size of a video of the decoded video signal output from the video decoder 11 to a size appropriate for the display 14 provided in the display apparatus 10.

The frame rate converter 13 performs frame rate conversion with respect to the video scaled by the scaler 12. For example, if a video frame rate of the video output from the scaler 12 is 60 Hz, the frame rate converter 13 may convert the frame rate into 120 Hz. Here, interpolation frames may be inserted between a plurality of frames forming the video. This will be described in detail with reference to FIG. 2.

Figure 2:
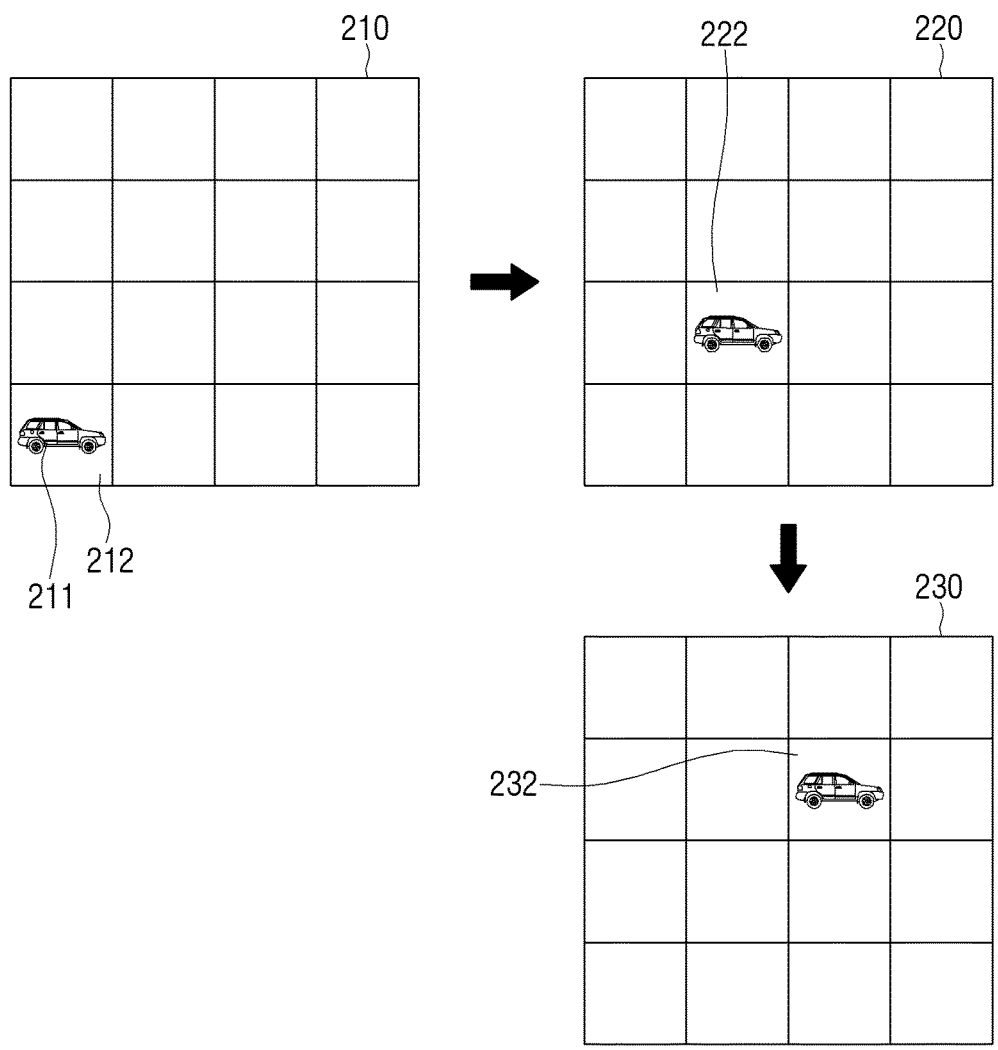
FIG. 2 illustrates a method of generating an interpolation frame, according to an exemplary embodiment.

FIG. 2 illustrates a method of generating an interpolation frame, according to an exemplary embodiment.

Referring to FIG. 2, reference numeral 210 denotes a previous frame, and reference numeral 230 denotes a current frame.

Referring to FIG. 2, a screen of the current frame 230 is in a state that a portion of a screen of the previous screen 210 is changed. In detail, the position of an automobile 211 has changed from block 212 of the previous frame 210 to block 232 of the current frame 230.

An interpolation frame 220 is a frame showing an intermediate scene between the current frame 230 and the previous frame 210. Therefore, in the interpolation frame 220, the automobile 211 may be located in block 222 positioned between block 212 and block 232. The interpolation frame 220 corresponding to the intermediate state between a state of the previous frame 210 and a state of the current frame 230 may be generated and inserted between the previous frame 210 and the current frame 230 to convert a frame rate. For example, if interpolation frames are inserted between the previous frame 210 and the current frame 230, a frame rate increases.

Motion Estimation (ME) and/or Motion Compensation (MC) technologies may be applied to generate the interpolation frame 220. As described above, if the ME and/or MC technologies are applied, the frame rate converter 13 may estimate an intermediate frame based on a previous frame and a subsequent frame, and then generate and insert a compensated frame. Here, the ME refers to an estimation of a motion or a displacement vector for locating a matching block of a reference frame in a current block. The MC is a process of actually arranging a block of a reference frame in a matching block of a current frame.

As described above, if the ME and/or MC technologies are applied, a video having a converted frame rate may express motions in a smooth manner. ME will be described in more detail with reference to FIG. 3.

The display 14 sequentially displays image frames output from the frame rate converter 13.

Figure 3:
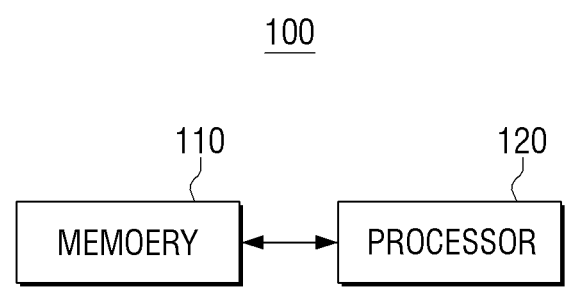
FIG. 3 is a block diagram of a configuration of a frame rate conversion apparatus according to an exemplary embodiment.

FIG. 3 is a block diagram of a frame rate conversion apparatus 100 according to an exemplary embodiment. The frame rate conversion apparatus 100 may correspond to the frame rate converter 13 of FIG. 1.

Referring to FIG. 3, the frame rate conversion apparatus 100 may include a memory 110 and a processor 120.

The memory 110 may store various types of data. In particular, the memory 110 may store a plurality of frames forming an input video. For example, the memory 110 may be a random access memory (RAM) but is not limited thereto. According to an exemplary embodiment, the input video may be provided by a streaming service and may be temporarily stored in memory 110 via buffering.

The processor 120 controls overall operations of the frame rate conversion apparatus 100.

In detail, the processor 120 may estimate a motion vector to generate an interpolation frame. For the motion estimation, the processor 120 performs block matching between a current frame and adjacent frames. Here, the block matching refers to a process of searching an adjacent frame for a block that matches a block of the current frame. A motion vector may be determined based on a location difference of the matching block between the current frame and a previous frame. This will be described in more detail with reference to FIGS. 4A through 4C.

Figure 4A:
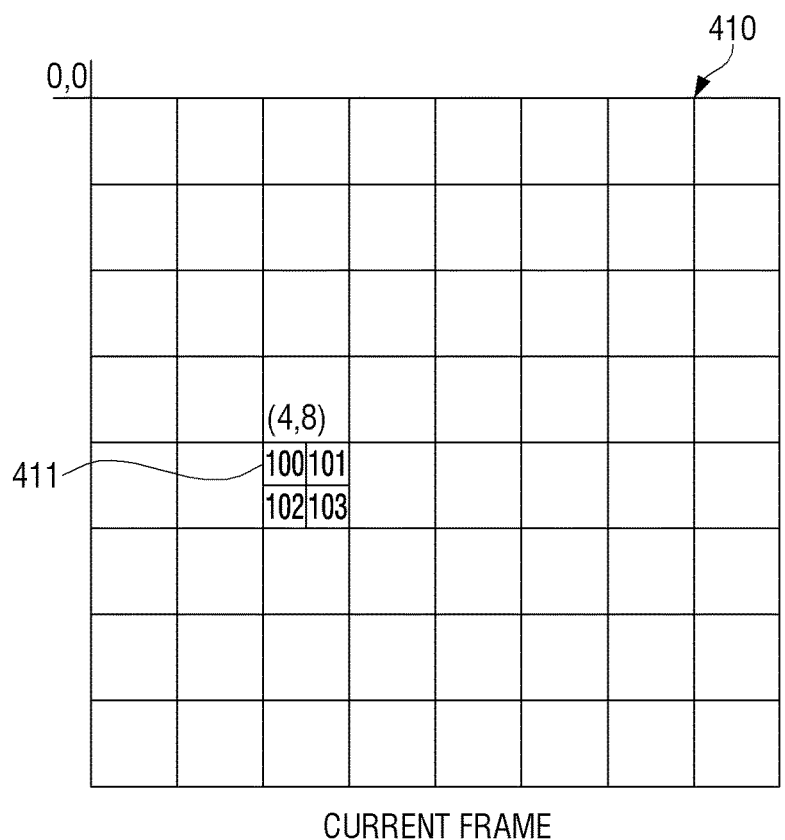
FIGS. 4A through 4C illustrate a block matching process according to an exemplary embodiment.
Figure 4B:
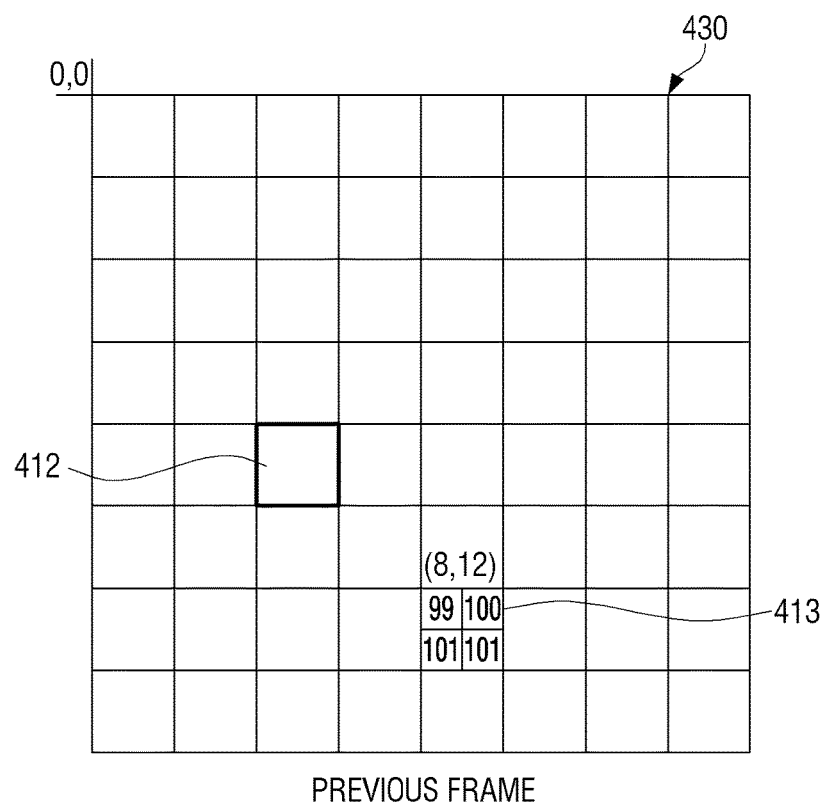
Figure 4C:
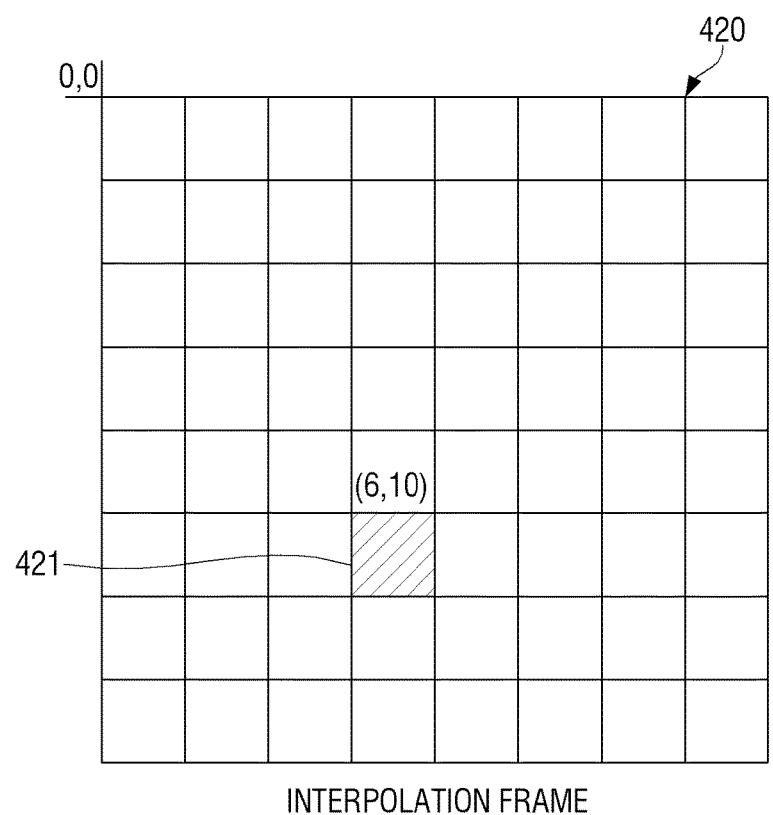

FIGS. 4A through 4C illustrate a block matching process according to an exemplary embodiment.

Hereinafter, the block matching and the motion estimation may be performed with respect to each block. The block matching may be performed between a current frame 410 and a previous frame 430. Here, a block refers to preset unit of which a frame is formed. In other words, a frame may be divided multiple blocks. A block includes multiple pixels. A shape of a block may be square, rectangular, or an arbitrary geometric shape. Also, a size of a block may vary according to an exemplary embodiment and is not limited to a particular size.

FIG. 4A illustrates a current frame 410 according to an exemplary embodiment. The current frame 410 is one of a plurality of frames forming an input video. A block 411 of the current frame 410 includes 4 pixels respectively having pixel values.

The processor 120 may perform block matching within a preset range. For example, as shown in FIG. 4B, pixels of adjacent blocks, which are located on upper, lower, left, and right sides of a block 412 that corresponds to the block 411 of the current frame 410 in the previous frame 430, may be set as a range of block matching.

The processor 120 may calculate differences in pixel values of a plurality of pixels forming the block 411 between the current frame 410 and the previous frame 430 within the range of the block matching. For example, the pixel values of the block 411 (coordinates 4, 8) of the current frame 410 are 100, 101, 102, and 103 from left top in a clockwise direction, and pixel values of a plurality of pixels forming a block 413 (coordinates 8, 12) of the previous frame 430, which is a target of block matching, are 99, 100, 101, and 101 from left top in a clockwise direction. Here, the processor 120 may calculate differences in pixel values between corresponding pixels and sum absolute values of the differences. In this case, a result value thereof is five. This is defined as a block matching value.

The processor 120 may perform such block matching with respect to all blocks within a block matching range. Specifically, a block that has the smallest block matching value in the previous block 430 may be determined as a matching block for the block 411 of the current frame 410.

If the block 413 is determined to a matching block for the block 411, the processor 120 may determine a motion vector of the block 411 of the current frame 410 based on locations (i.e., coordinate values) of the block 411 of the current frame 410 and the block 413 of the previous frame 430. For example, the processor 120 may determine the motion vector of the block 411 of the current frame 410 as (4, 4) based on the coordinates (4, 8) of the block 411 of the current frame 410 and the coordinates (8, 12) of the block 413 of the previous frame 430.

The processor 120 may determine a noise strength of the block 411 of the current frame 410 based on a block matching result for the current frame 410.

Specifically, the processor 120 may determine a noise strength of a block of the current frame 410 based on a pixel value difference between the block 411 of the current frame 410 and the block 413 of adjacent frames. The adjacent frames may be the previous frame 430, a subsequent frame of the current frame 410, or any other frames than the current frame 410. For convenience of description, hereinafter, an adjacent frame will be described as the previous fame 430.

The processor 120 may determine a block matching value between the block 411 of the current frame 410 and the block 413 of the previous frame 430 as a noise strength.

For example, the block matching value five of the block matching described above may be determined as a noise strength of the block 411 of the current frame 410. As described above, block matching is a process of searching for the most similar block, and a block matching value for a block completely matching the block is zero, which indicates that noise does not occur except a real image signal. In other words, if a block matching value between blocks is large, a determination may be made that each of the blocks includes a large amount of noise.

The processor 120 may estimate a motion vector of a block of an interpolation frame 420 inserted between the current frame 410 and the previous frame 430, and generate the interpolation frame 420 based on the strength of the noise.

If the noise strength of the block 411 of the current frame 410 is less than a preset value, i.e., a noise strength threshold value, the processor 120 may estimate a motion vector of a block of the interpolation frame 420 based on block matching of the block 411 of the current frame 410. Here, a preset noise strength value may indicate trustworthiness of a motion vector estimated based on block matching for the block 411 of the current frame 410.

In detail, the processor 120 may perform block matching for a block of a current frame with adjacent frames and estimate a motion vector of a block of an interpolation frame based on a location of a matching block of the adjacent frames.

For example, the preset noise strength value may be ten. Here, the processor 120 may determine a noise strength of the block 411 of the current frame 410 by using the above-described block matching. Here, the noise value determined by the block matching value between the block 411 of the current frame 410 and the block 413 of the previous frame 430 is five, and thus is less than the preset noise strength value. Therefore, a motion vector of a block 421 of the interpolation frame 420 may be estimated based on a block matching result of the block 411 of the current frame 410.

As aforementioned, a motion vector of the block 411 of the current frame 410, which is extracted according to a location of the block 411 of the current frame 410 and a location of the block 413 of the previous frame 430, is (4, 4). Referring to FIG. 4C, the interpolation frame 420 may be temporally located between the current frame 410 and the previous frame 430, and thus a motion vector of the block 421 of the interpolation frame 420 may be (2, 2) (if a current frame is a reference frame).

If a noise strength of a block of a current frame is higher than a preset threshold value, the processor 120 may compensate for a motion vector acquired by block matching of the block of the current frame, to estimate a motion vector of a block of an interpolation frame.

In detail, the processor 120 may compensate for the motion vector with reference to a motion vector acquired according to block matching of another block of the current frame. This will now be described in more detail with reference to FIG. 5.

Figure 5:
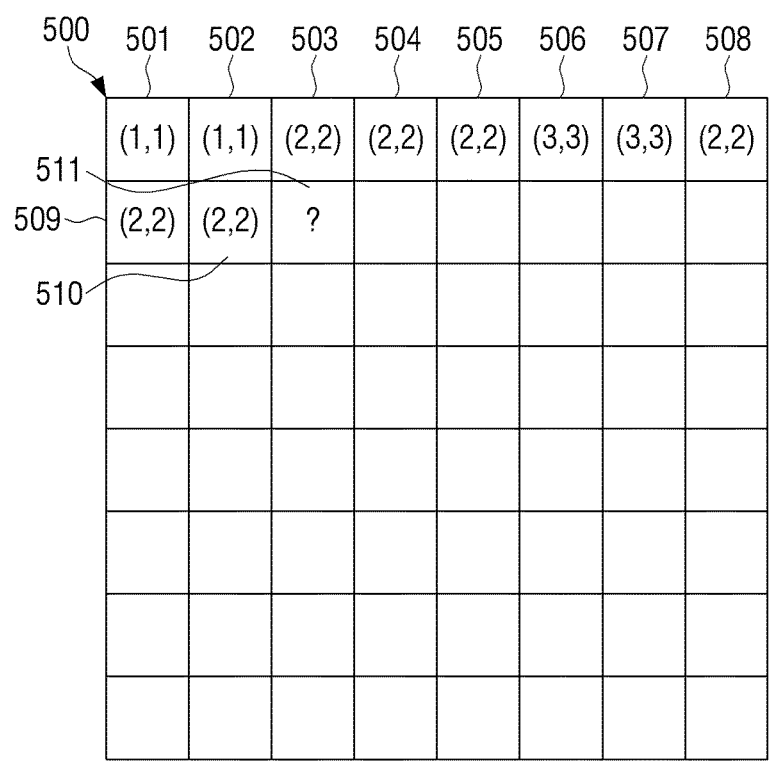
FIG. 5 illustrates a method of determining noise strength of a block of a current frame, according to an exemplary embodiment.

FIG. 5 illustrates a noise strength of the current frame 500, according to an exemplary embodiment.

In FIG. 5, it is assumed that noise strengths of blocks 501 through 510 of the current frame 500 are less than a preset value, and a noise strength of a block 511 is greater than the preset value.

Because the noise strength of the block 511 of the current frame 500 is greater than the preset value, the processor 120 may refer to motion vectors acquired according to block matching of other blocks 501 through 510 of the current frame 500 to estimate a motion vector of the block 511 of the current frame 500.

For example, the processor 120 may use an average of the motion vectors acquired according to the block matching of the other blocks 501 through 510 of the current frame 500 to estimate the motion vector of the block 511 of the current frame 500. Therefore, the processor 120 may not estimate a motion vector based on a block matching value of the block 511 of the current frame 500 but may determine an average (2, 2) of the motion vectors acquired according to block matching of the other blocks 501 through 510 of the current frame 500 as a motion vector of the block 511 of the current frame 500. As a result, the processor 120 may estimate a motion vector of a block of an interpolation frame corresponding to the block 511 of the current frame 500 as (1, 1).

As another example, if a noise strength of the block 511 of the current frame 500 is greater than a preset value, the processor 120 may compensate for a motion vector of the block 511 of the current frame 500 estimated according to block matching by adjusting the motion vector of the block 511 to be inversely proportional to the noise strength to estimate a motion vector of a block of an interpolation frame.

As another example, if a noise strength of the block 511 of the current frame 500 is greater than a preset value, the processor 120 may estimate a motion vector of the block 510, which is determined immediately before estimating a motion of the block 511 of the current frame 500, as a motion vector of the block 511 of the current frame 500.

The processor 120 may determine a noise strength of a current frame based on noise strengths of a plurality of blocks forming the current frame. If the noise strength of the whole current frame is greater than a preset value, the processor 120 may not perform motion estimation with respect to the current frame. Instead, the processor 120 may generate an interpolation frame having pixels of which values are obtained by averaging corresponding pixels between the current frame and the adjacent frame.

In the above-described example, a noise strength is determined based on a result of block matching with respect to a current frame. However, according to an exemplary embodiment, the noise strength may be determined based on a result of block matching with respect to a previous frame, and thus a motion estimation may be performed according to the determination result. This will be described with reference to FIG. 6.

Figure 6:
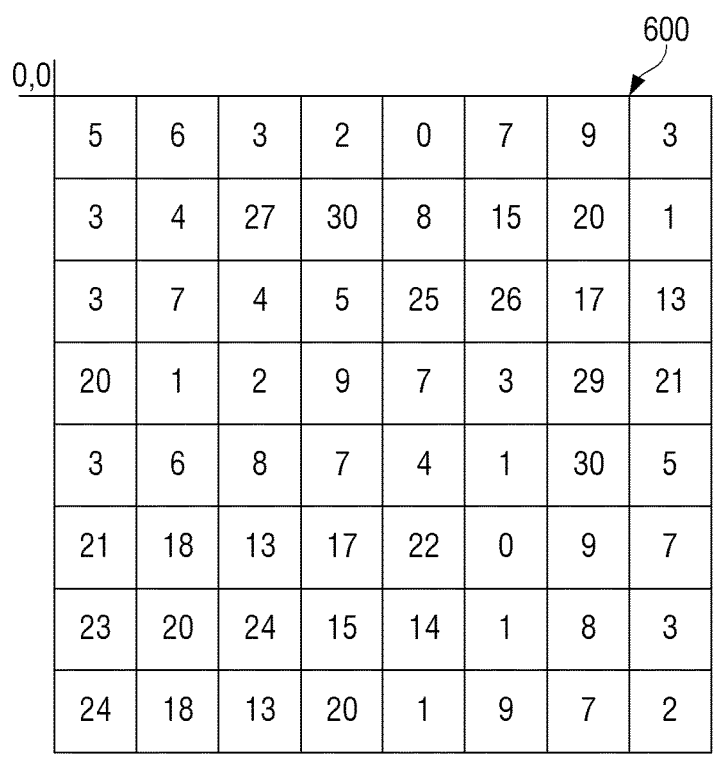
FIG. 6 illustrates a method of determining noise strength of a block of a current frame, according to another exemplary embodiment.

FIG. 6 illustrates a current frame 600 according to another exemplary embodiment.

Referring to FIG. 6, the current frame 600 may use a noise strength of blocks of a previous frame. The processor 120 may store a map storing the noise strength values of the blocks of the previous frame in the memory 110. Here, the processor 120 may use the noise strength of blocks stored in the map as noise strength of corresponding blocks of the current frame 600 to perform motion estimation with respect to a block of the current frame 600.

Figure 7:
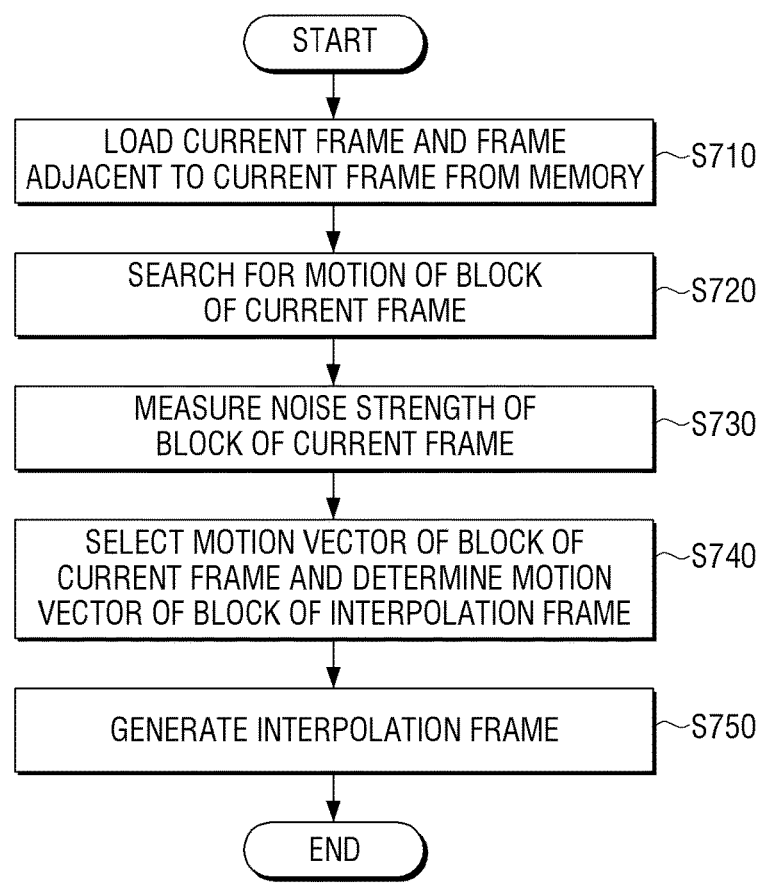
FIG. 7 is a flowchart illustrating a process of generating an interpolation frame, according to an exemplary embodiment.

FIG. 7 is a flowchart of a process of generating an interpolation frame according to an exemplary embodiment.

In FIG. 7, an estimation of a block of a current frame may include a motion search and a motion estimation. Here, the motion search is a process of acquiring differences in pixel values of corresponding blocks between different frames to perform block matching, and motion estimation is a process of determining a motion vector based on a noise strength of a block.

In operation S710, the processor 120 loads a current frame and a frame adjacent to the current frame from the memory 110 in operation S710.

In operation S720, the processor 120 searches for a motion of a block of the loaded current frame.

In operation S730, the processor measures noise strength of the block of the current frame based on the search result.

In operation S740, the processor 120 selects a motion vector of the block of the current frame and determines a motion vector of a block of an interpolation frame based on the selection result.

In operation S750, the processor 120 generates an interpolation frame using the motion vector of the block of the interpolation frame.

Here, the processor 120 may proportionally apply pixel values of pixels of blocks of the current frame indicated by the motion vector of the block of the interpolation frame and pixel values of pixels of blocks of the frame adjacent to the current frame to generate the interpolation frame.

For example, if one interpolation frame is inserted between a current frame and a previous frame, the processor 120 may determine pixel values of pixels of a block of the interpolation frame by averaging pixel values of corresponding blocks between the current frame and the previous frame (i.e., the average may be obtained by applying a current frame pixel and an adjacent frame pixel at a ratio of 1:1.)

Figure 8:
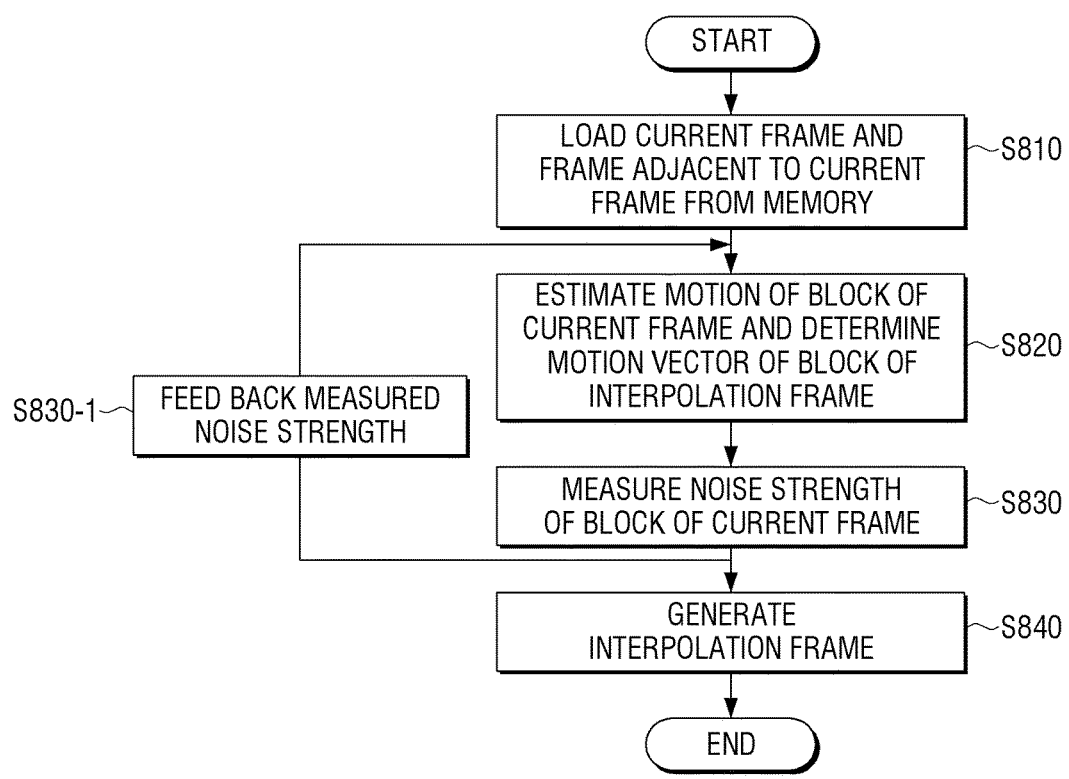
FIG. 8 is a flowchart illustrating a process of generating an interpolation frame, according to another exemplary embodiment.

FIG. 8 is a flowchart of a process of generating an interpolation frame according to another exemplary embodiment.

In FIG. 8, a noise strength measured from a frame is applied as noise strength of a next frame, as described with reference to FIG. 6.

In operation S810, the processor 120 loads a current frame and a frame adjacent to the current frame from a memory.

In operation S820, the processor 120 performs a motion estimation of a block of the loaded current frame and determines a motion vector of a block of an interpolation frame.

In operation S830, the processor 120 measures noise strength of the block of the current frame.

In operation S830, the measured noise strength of the block of the current frame is fed back to be used to determine a motion estimation of a block of a next frame and a motion vector of a block of a next interpolation frame.

In operation S840, the processor 120 generates an interpolation frame using the determined motion vector of the block of the interpolation frame.

As described above, according to the exemplary embodiment, the noise strength of a block may be used to estimate a motion vector in an efficient and highly reliable manner without a process of removing noise from a frame. As a result, an interpolation frame may be generated without deteriorating the image quality.

An equation used for block matching according to an exemplary embodiment is as follows. Here, block matching between a current frame and a previous frame F(t−1) is referred to as a backward block matching, and block matching between a next frame F(t+1) and the current frame is referred to as forward block matching. The backward block matching is to divide a current frame into several square blocks and calculate minimum Sum of Absolute Differences (SADs) of the blocks from a previous frame. This is expressed as in Equation 1 below:

$$bSAD(v_x, v_y) = \sum_{i=0}^{N-1}\sum_{j=0}^{N-1} |F(x_0+i, y_0+j, t) - F(x_o+v_x+1, y_0+v_y+j, t-1)| \quad (1)$$

wherein parameters Ft−1 and Ft respectively denote a previous frame and a current frame, N denotes a size of a block, and $(x_0, y_0)$ denotes a location of a left upper pixel of $(b_x, b_y)^{th}$ block that is defined as in Equations 2 and 3 below:

$$x_0 = N \times b_x \quad (2)$$

$$y_0 = N \times b_y \quad (3)$$

In Equation 1 above, $v=(v_x, v_y)$ denotes a motion vector, i.e., a distance between a block of the current frame and a block of the previous block (i.e., a difference between pixel coordinates). The forward block matching is performed according to the same principle as the backward block matching and uses a next frame instead of the previous frame. This is defined as in Equation 4 below:

$$fSAD(v_x, v_y) = \sum_{i=0}^{N-1}\sum_{j=0}^{N-1} |F(x_0+i, y_0+j, t) - F(x_o+v_x+1, y_0+v_y+j, t+1)| \quad (4)$$

SAD values of motion vectors existing in a search range are acquired, and a minimum SAD value is searched to perform a process of searching for a motion estimation by using block matching. If a horizontal search range is Sx, and a vertical search range is Sy, a motion vector $v^b=(v^b_x, v^b_y)$ having a minimum SAD in backward block matching is defined as in Equation 5:

$$(v^b_x, v^b_y) = \underset{-s_x < v_x < s_x, -s_y < v_y < s_y}{\operatorname{argMin}} [bSAD(v_x, v_y)] \quad (5)$$

A noise measurement is calculated based on a minimum value of SAD values of several motion vectors calculated in backward and forward block matching processes as in Equation 6 below:

$$N(b_x, b_y) = \operatorname{MIN}[bSAD(v^b_x, v^b_y), fSAD(v^f_x, v^f_y)] \quad (6)$$

A motion vector selection defines a motion vector of each block based on a motion search result and measured noise. In detail, the motion vector increases a weight of a low frequency signal when calculating Cost value of a backward motion vector and is calculated as in Equation 7 below.

$$C(v_x, v_y) = (1-\tilde{N}(b_x, b_y)) \times bSAD(v_x, v_y) + \tilde{N}(b_x, b_y, t) \times bSAD_{LPF}(v_x, v_y) \quad (7)$$

wherein $bSAD_{LPF}$ denotes a block matching value that is calculated from an image from which noise is removed by performing low pass filtering performed with respect to current and previous frames. Also, Ñ denotes a value calculated from N, has a value between 0 and 1, and indicates that there is noise as being closer to 1. In other words, Equation 7 means that as a large amount of noise exists, a ratio of a block matching value acquired from a low frequency image increases.

Ñ may be applied as a method of reflecting a noise strength in Cost value of a motion vector and a method of inducing a block to have a similar motion vector to an adjacent block or strengthening a strength of low frequency filtering.

Figure 9:
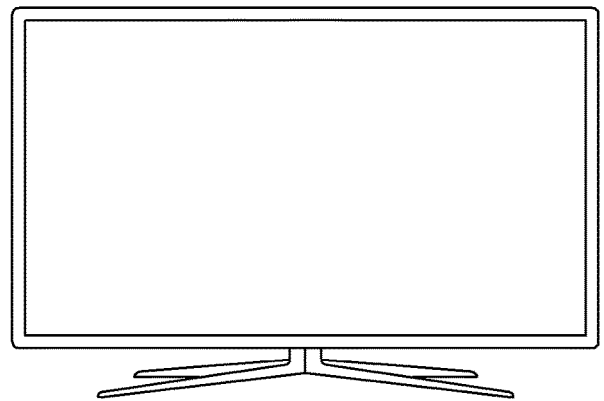
FIG. 9 illustrates a display apparatus according to an exemplary embodiment.

FIG. 9 illustrates a display apparatus 900 according to an exemplary embodiment.

Referring to FIG. 9, a TV is illustrated as an example of the display apparatus 900. The frame rate conversion apparatus 100 may be embedded in the TV 900. In other words, the TV 900 may determine a noise strength of a block of an image frame to estimate a motion vector of a block of an interpolation frame inserted between the image frame and a fame adjacent to the image frame. This will be described in more detail with reference to FIG. 10.

Figure 10:
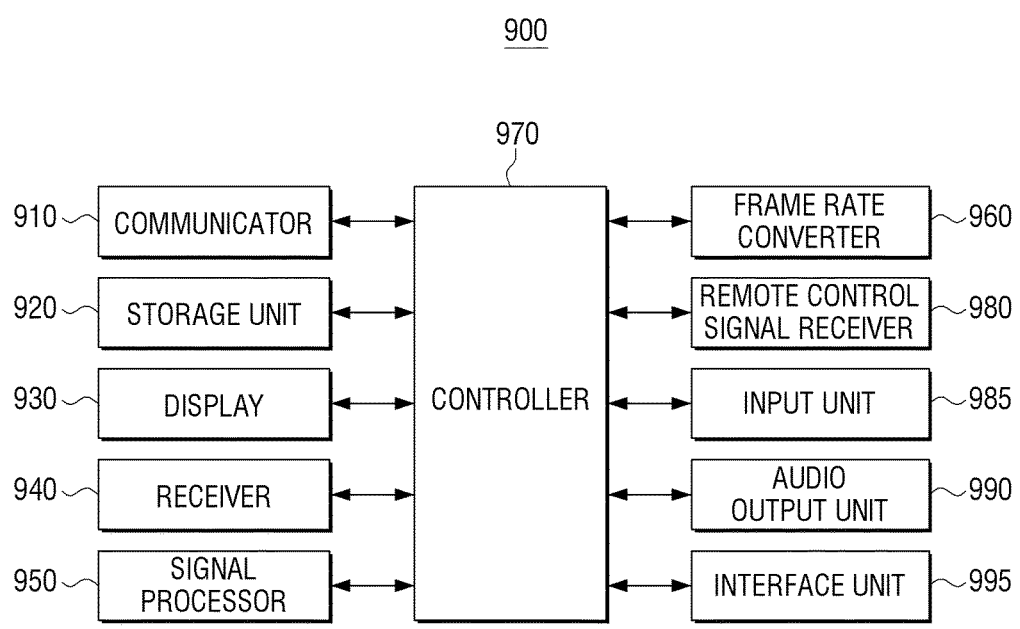
FIG. 10 is a block diagram of a display apparatus according to an exemplary embodiment.

FIG. 10 is a block diagram of a display apparatus 900 according to an exemplary embodiment.

Referring to FIG. 10, the display apparatus 900 includes a communicator 910, a storage unit 920, a display 930, a receiver 940, a signal processor 950, a frame rate converter 960, a controller 970, a remote control signal receiver 980, an input unit 985, an audio output unit 990, and an interface unit 995.

The communicator 910 performs communications through a network (i.e., a communication network). In detail, for network communications, the communicator 910 may perform communications with various types of external apparatuses (e.g., another apparatus, server, etc.) connected to the network by using a network address allocated to the display apparatus 900.

Here, the network address may be an Internet Protocol (IP) address. In other words, the communicator 910 may perform a communication with another external apparatus (not shown) connected to an internet network by using the IP address.

The communicator 910 may perform a network communication by using various types of communication methods.

In detail, the communicator 910 may perform the network communication by using various types of communication methods such as a Wired/Wireless Local Area Network (WLAN), WiFi, a Wide Area Network (WAN), Ethernet, Bluetooth, Zigbee, a Universal Serial Bus (USB), IEEE 1394, etc. For this, the communicator 910 may include various types of communication modules for performing network communications according to communication methods. For example, if the communicator 910 performs a communication according to a wired LAN method, the communicator 910 may include a wired LAN card (not shown). If the communicator 910 performs a communication according to a WiFi method, the communicator 910 may include a WiFi chip (not shown).

The storage unit 920 stores various types of data and an operating system (O/S) for driving and controlling the display apparatus 900.

The storage unit 920 also stores a basic program that may be executed in the display apparatus 900. Here, the basic program may be an application program necessary for providing a basic function (or a basic service) of the display apparatus 900.

In detail, the basic program is an application program that is first installed in the display apparatus 900 by a manufacturer when manufacturing the display apparatus 900, i.e., is an application program that may not be arbitrarily deleted by a user of the display apparatus 900.

For example, if the manufacturer of the display apparatus 900 provides a content search function, a content play function, a search function for various types of application programs installed in the display apparatus 900, an Internet access function, and a setting function as basic functions, the storage unit 920 may store a basic program that may provide a corresponding basic function.

The storage unit 920 may also store a download program that may be executed in the display apparatus 900. Here, the download program may be an application program necessary for providing a basic function and an additional function (or an additional service) through the display apparatus 900.

In detail, the download program refers to an application program that may be arbitrarily installed in or deleted from the display apparatus 900 by the user differently from a basic program.

For example, the user may download a download program, which may provide an additional function such as a game function, a chatting function, or the like, from an external apparatus (not shown) and install the download program in the display apparatus 900, and the storage unit 920 may store the download program that may provide the corresponding additional function.

For this, the storage unit 920 may be realized as a storage medium such as a non-volatile memory (e.g., a flash memory), an Electrically Erasable Read Only Memory (EE-ROM), a hard disk, or the like.

The storage unit 920 may store the basic program and the download program in separate areas. In detail, the storage unit 920 may divide a storage area of a storage medium into a plurality of storage areas and store the basic program and the download program in different areas. For example, if the storage unit 920 is realized as a flash memory, the storage unit 920 may store the basic program in a first storage area of the flash memory and the download program in a second storage area of the flash memory. In this case, a storage area for storing the basic program may be a storage area that may not be arbitrarily accessed by the user, and a storage area for storing the download program may be a storage area that may be accessed by the user. In other words, the user may not delete the basic program stored in the storage area for storing the basic program but may delete the download program stored in the storage area for storing the download program.

Various types of data and the O/S for driving and controlling the display apparatus 9000 may be stored together in the storage area storing the basic program and may be referred to as firmware.

However, this is only an exemplary embodiment, and thus the storage unit 920 may store the basic program and the download program in different storage media. In other words, if the storage unit 920 is realized as a plurality of flash memories, the basic program may be stored in a first flash memory, and the download program may be stored in a second flash memory.

The storage unit 920 may store a plurality of frames forming an image or a video. The frame rate converter 960 that will be described later may determine a noise strength of a block of an image frame stored in the storage unit 920 and generate an interpolation frame by using the determined noise strength of the block and a motion vector acquired through block matching.

The display 930 displays various types of screens. In detail, the display 930 may display a menu for executing the basic program. Here, the menu may include a menu item for executing the basic program that may provide the basic function of the display apparatus 900.

For this, the display 930 may be realized as a Liquid Crystal Display (LCD), an Organic Light Emitting Diode (OLED) display, a Plasma Display Panel (PDP), or the like.

The receiver 940 may receive a broadcast content (or a broadcast signal). The broadcast content may include an image, audio, and additional data (e.g., Electronic Program Guide (EPG)), and the receiver 940 may receive a broadcast content from various types of sources such as terrestrial broadcasting, cable broadcasting, satellite broadcasting, Internet broadcasting, etc. For example, the receiver 940 may receive a video stream that is acquired by coding a broadcast content image.

Here, the receiver 940 may be realized as a form, including elements such as a tuner, a demodulator, an equalizer, etc., to receive a broadcast content from a broadcasting station.

The signal processor 950 performs signal-processing with respect to a content received through the receiver 940. In detail, the signal processor 950 may perform an operation, such as decoding, scaling, frame rate conversion, or the like, with respect to an image forming the content, to signal-process the image in a form that may be output from the display 930. The signal processor 950 may also perform signal-processing, such as decoding or the like, with respect to audio forming the content to signal-process the audio in a form that may be output from the audio output unit 990.

The frame rate converter 960 may convert a frame rate. For this, the frame rate converter 960 may determine a noise strength of a block of an image frame stored in the storage unit 920. Here, the frame rate converter 960 may determine the noise strength of the block by using block matching of the block of the image frame. The frame rate converter 960 may correspond to the frame rate conversion apparatus 100.

Here, the frame rate converter 960 may be realized as a chip including the memory 110 and the processor 120 described above but is not limited thereto. Also, the frame rate converter 960 may not include the memory 110. In this case, the frame rate converter 960 may store and load an image frame by using the storage unit 920 instead of the memory 110.

The controller 970 controls an overall operation of the display apparatus 900. The controller 970 may include a Central Processing Unit (CPU) (not shown), an ROM (not shown), and a Random Access Memory (RAM) (not shown) for an operation of the display apparatus 900.

The ROM stores a command set, etc. for booting a system. If power is supplied through an input of a turn-on command, the CPU copies the O/S stored in the storage unit 920 into the RAM according to a command stored in the ROM and executes the O/S to boot the system. If the system is completely booted, the CPU copies various types of application programs stored in the storage unit 920 into the RAM and executes the application programs copied into the RAM to perform various types of operations.

The CPU accesses the storage unit 920 to perform booting by using the O/S stored in the storage unit 920. The CPU also performs various types of operations by using various types of programs, contents, data, etc. stored in the storage unit 920.

The remote control signal receiver 980 receives a remote control signal input from a remote controller.

For example, the remote control signal receiver 980 may receive a remote control signal for turning on the display apparatus 900 or displaying a menu. If the remote control signal for turning on the display apparatus 900 or displaying the menu is received, the controller 970 may display a menu for executing the basic program. Here, the controller 970 may differentially configure and display the menu according to a location of the display apparatus 900.

Besides this, the remote control signal receiver 980 may receive various types of remote control signals. For example, the remote control signal receiver 980 may receive a remote control signal for performing a channel change, a volume control, or the like, and the controller 970 may change a channel of the display apparatus 900 or control a volume of the display apparatus 900 according to the received remote control signal.

The input unit 985 receives various types of user commands. The controller 970 may execute a function corresponding to a user command input from the input unit 985.

For example, if a user command for turning on the display apparatus 900 or a user command for displaying the menu is input through the input unit 985, the controller 970 may display a menu for executing the basic program. In this case, the controller 970 may differentially configure and display the menu according to a location of the display apparatus 900.

Besides this, the input unit 985 may receive a user command for performing a channel change, a volume control, or the like, and the controller 970 may change a channel or control a volume according to the user command.

The audio output unit 990 may convert an audio signal output from the signal processor 950 into a sound and output the sound through a speaker (not shown) or output the sound to an external apparatus connected through an external output port (not shown).

The interface unit 995 connects various types of other apparatuses (not shown) to the display apparatus 900. The interface unit 995 may also transmit a content, etc. pre-stored in the display apparatus 900 to another apparatus (not shown) or may receive a content, etc. from the another apparatus.

For this, the interface unit 995 may include at least one selected from a High-Definition Multimedia Interface (HDMI) input port, a component input port, a PC input port, and a USB input port.

Figure 11:
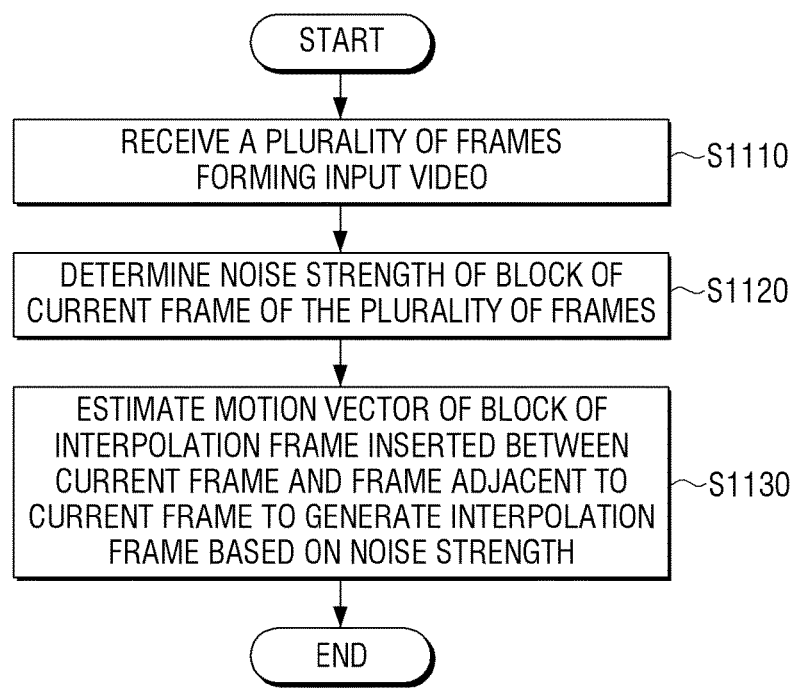
FIG. 11 is a flowchart illustrating a method of converting a frame rate, according to an exemplary embodiment.

FIG. 11 is a flowchart illustrating a method of converting a frame rate, according to an exemplary embodiment.

In operation S1110, a plurality of frames forming an input video are received by the frame rate converter 960.

In operation S1120, a noise strength of a block of a current frame is determined.

In operation S1130, a motion vector of a block of an interpolation frame inserted between the current frame and an adjacent frame, e.g., a previous frame or a next frame, may be estimated based on the noise strength to generate the interpolation frame.

Here, the frame rate conversion method may further include performing block matching between the current frame and adjacent frames to estimate the motion vector of the interpolation frame and determining the noise strength of the block of the current frame based on the block matching result.

The frame rate conversion method may further include determining the noise strength of the block of the current frame based on pixel value differences between a block of the current frame and a matching block of the adjacent frame.

The frame rate conversion method may further include estimating the motion vector of the interpolation frame based on block matching of the block of the current frame if the noise strength of the block of the current frame is less than a preset value.

The frame rate conversion method may further include determining the matching block from the adjacent frames and estimating the motion vector of the block of the interpolation frame based on a location of the matching block.

The frame rate conversion method may further include compensating for a motion vector acquired according to the block matching if the noise strength of the block of the current frame is greater than the preset value.

The frame rate conversion method may further include compensating for the motion vector acquired according to the block matching based on a motion vector acquired according to block matching of another block of the current frame.

Frame rate conversion method of the frame rate conversion apparatus 100 according to various exemplary embodiments described above may be embodied as a computer executable program code and then stored on a non-transitory computer readable medium to be provided to each server or devices to be executed by the processor 120.

There may be provided a non-transitory computer readable medium that stores a program performing storing a plurality of frames forming an input image, determining a noise strength of a current frame of the plurality of frames, and estimating a motion vector of a block of an interpolation frame inserted between the current frame and a frame adjacent to the current frame based on the noise strength.

The non-transitory computer readable medium is a medium which does not store data temporarily such as a register, cash, and memory but stores data semi-permanently and is readable by devices. More specifically, the aforementioned applications or programs may be stored in the non-transitory computer readable media such as compact disks (CDs), digital video disks (DVDs), hard disks, Blu-ray disks, universal serial buses (USBs), memory cards, and read-only memory (ROM).

The foregoing exemplary embodiments and advantages are merely exemplary and are not to be construed as limiting the present inventive concept. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A frame rate conversion apparatus comprising:
   at least one processor configured to identify a noise strength of a block of a current frame among a plurality of frames forming an input video, obtain an interpolation frame by estimating a motion vector of a block of the interpolation frame corresponding to the block of the current frame based on the noise strength, and insert the interpolation frame between the current frame and at least one adjacent frame to adjust a frame rate of the input video,
   wherein the processor is further configured to perform block matching between the block of the current frame and a block of the adjacent frame and identify the noise strength based on the block matching, and
   wherein in response to the noise strength of the block of the current frame being greater than a noise strength value, the processor is further configured to estimate the motion vector of the block of the interpolation frame by correcting a motion vector acquired according to the block matching.

2. The frame rate conversion apparatus of claim 1, wherein the processor is further configured to identify the noise strength of the block of the current frame based on pixel value differences between the block of the current frame and corresponding blocks of the adjacent frames.

3. The frame rate conversion apparatus of claim 1, wherein in response to the noise strength of the block of the current frame being less than the noise strength value, the processor is further configured to estimate the motion vector of the block of the interpolation frame based on the block matching.

4. The frame rate conversion apparatus of claim 3, wherein the processor is further configured to estimate the motion vector of the block of the interpolation frame based on a location of the block of the adjacent frame matching with the block of the current frame.

5. The frame rate conversion apparatus of claim 1, wherein in response to the noise strength of the block of the current frame being greater than the noise strength value, the processor is further configured to estimate the motion vector of the block of the interpolation frame by correcting the motion vector acquired according to the block matching.

6. The frame rate conversion apparatus of claim 5, wherein the processor is further configured to correct the motion vector acquired according to the block matching based on at least one motion vector of at least one other block of the current frame.

7. A frame rate conversion method comprising:
   identifying a noise strength of a block of a current frame among a plurality of frames forming an input video;
   obtaining an interpolation frame by estimating a motion vector of a block of the interpolation frame corresponding to the block of the current frame based on the noise strength; and
   inserting the interpolation frame between the current frame and at least one adjacent frame to adjust a frame rate of the input video,
   wherein the identifying the noise strength frame comprises:
      performing block matching between the block of the current frame and a block of the adjacent frame and identifying the noise strength based on the block matching,
      in response to the noise strength of the block of the current frame being greater than a noise strength value, estimating the motion vector of the block of the interpolation frame by correcting a motion vector acquired according to block matching.

8. The frame rate conversion method of claim 7, further comprising:
   identifying the noise strength of the block of the current frame based on pixel value differences between the block of the current frame and corresponding blocks of the adjacent frames.

9. The frame rate conversion method of claim 7, further comprising:
   in response to the noise strength of the block of the current frame being less than the noise strength value, estimating the motion vector of the block of the interpolation frame based on the block matching.

10. The frame rate conversion method of claim 9, further comprising:
    estimating the motion vector of the block of the interpolation frame based on a location of the block of the adjacent frame matching with the block of the current frame.

11. The frame rate conversion method of claim 7, further comprising:
    in response to the noise strength of the block of the current frame being greater than the noise strength value, estimating the motion vector of the block of the interpolation frame by correcting the motion vector acquired according to the block matching.

12. The frame rate conversion method of claim 11, the estimating the motion vector the block of the interpolation frame comprising:
    correcting the motion vector acquired according to the block matching based on at least one motion vector of at least one other block of the current frame.

* * * * *